Jan. 11, 1944.          W. D. CALLAN          2,338,801
CONDUIT
Filed Jan. 26, 1942
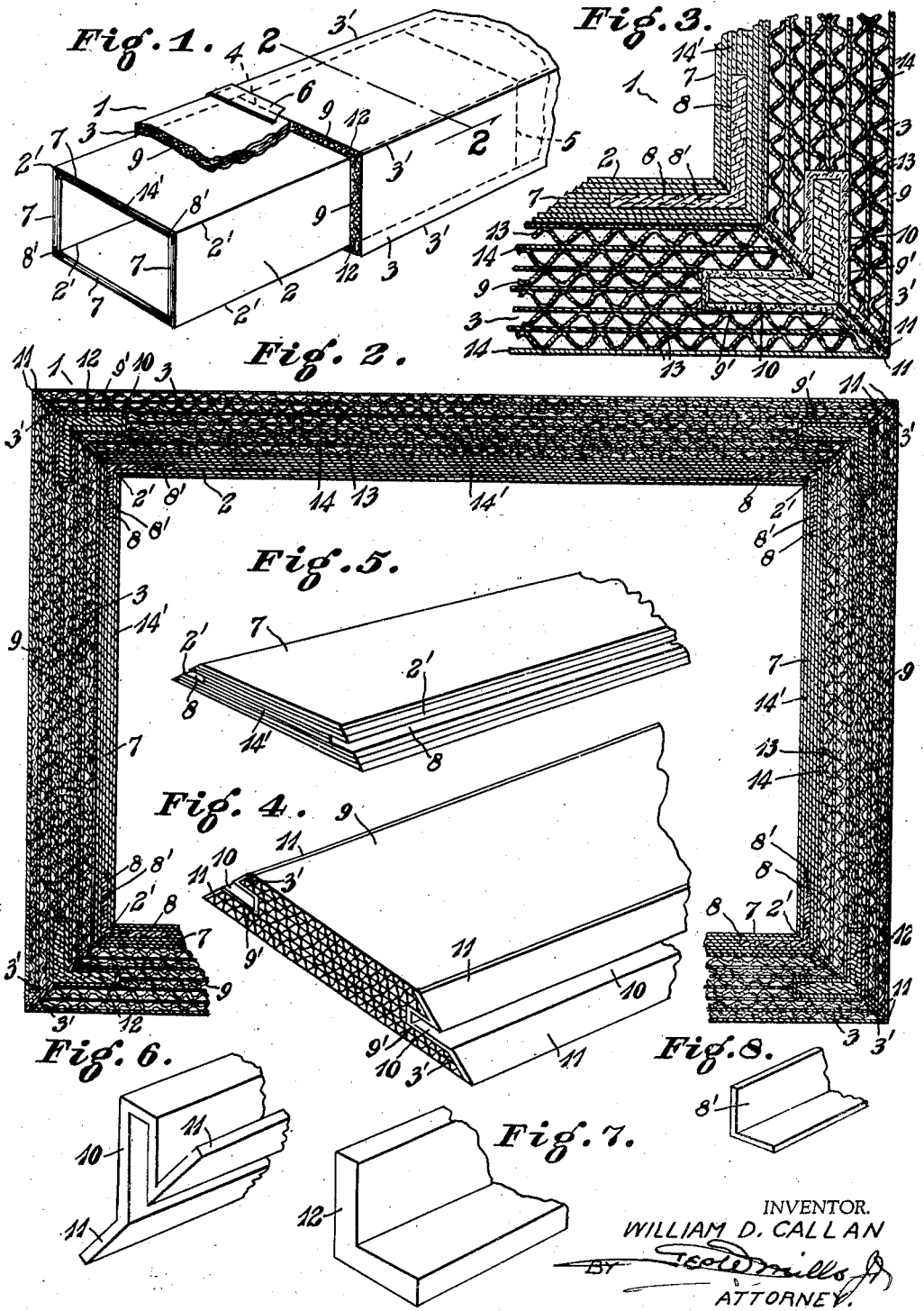
INVENTOR.
WILLIAM D. CALLAN
ATTORNEY.

Patented Jan. 11, 1944

2,338,801

UNITED STATES PATENT OFFICE 2,338,801

CONDUIT

William D. Callan, Norwood, Ohio

Application January 26, 1942, Serial No. 428,225

10 Claims. (Cl. 138—75)

This invention relates to an improvement in conduits composed of separate side walls readily assembled together, and more particularly side wall members built up from a plurality of plies which are laminated together and adhered or otherwise secured by suitable fastening means. The plies of the side wall members may be all flat, all indented sheets, or flat and indented sheets alternately disposed.

Heretofore conduits, particularly suitable for use in air conditioning units, have been made from plain or indented plies wound or spun about a form or mandrel into unitary longitudinal sections suitable for being assembled in end to end relation. These sections are, of course, very bulky for handling and shipping, and need to be well packaged to prevent injury to them. If any part of the section is chipped, indented or marred then the entire section is rendered unsuitable for use. Where the conduit is composed of inner and outer wall longitudinal sections which are telescoped together in end to end relation with the joints between the ends of the inner and outer sections staggered, the sections need to be perfectly formed to permit their ready assembly. While perfectly formed at the time of manufacture, they may become warped and bent during shipment and handling because of their large and bulky sizes which, of course, makes them difficult to assemble as well as impairing the close fitting of the abutting ends.

The aim of the present invention is to provide a conduit composed of separate side wall members which may be stacked or nested, thereby permitting a number of the sides to be packaged in a compact bundle and shipped to the place of use where they may be readily assembled into conduit sections. The novel construction not only provides a less bulky package, but if any one of the side members is injured, only that injured member is rendered unsuitable for use and not the entire conduit section, or the other sides which make up the conduit section.

These conduits are preferably made rectangular in cross section and the present invention is illustrated as applied to a rectangular section, although it is readily apparent the invention is not limited to any particular shape or form of section. It is likewise suitable for any form of conduit in which the walls are composed of separate members with the longitudinal edges thereof fitted together to make up the conduit or sections thereof.

For a better understanding of the invention reference may be made to the accompanying drawing in which:

Fig. 1 is a perspective view of a portion of a double walled conduit made up of sections embodying the invention;

Fig. 2 is a cross section on line 2—2 of Fig. 1;

Fig. 3 is a cross sectional view on an enlarged scale of one of the corners of the conduit;

Fig. 4 is a perspective view of a portion of one of the side walls of the outer section;

Fig. 5 is a perspective view of a portion of one of the side walls of the inner section;

Fig. 6 is a perspective view of a portion of a reenforcing strip for the longitudinal edges of the side wall members; and Figs. 7 and 8 are perspective views of angle members for inserting in the corners of abutting wall sections.

Referring to the drawing in which like numerals are used to designate like parts, numeral 1 is a conduit of indefinite length composed of inner wall sections 2 and outer wall sections 3 which are assembled in end to end relation with the inner and outer wall sections telescoping and with the end joints 4 between the sections of the outer wall staggered with the end joints 5 between the inner sections. Some sealing means of suitable adhesive character, like cement or sodium silicate, may be applied to the abutting ends of the sections to air seal the end joints. The end joints between the outer sections may be further protected by a strip 6 of paper, fabric, or the like wrapped adhesively about the conduit over the joint seam.

The inner conduit section 2 is composed of laminated side members 7, these being preferably constructed of asbestos paper or felt laminated and bonded with adhesive such as sodium silicate or the like. In order to better match the corners, the longitudinal edges 2' of the side members 7 are preferably beveled. A groove 8 is formed along the longitudinal beveled edge, being formed either by cutting the groove after the side member is manufactured or having some of the intermediate plies of less width for terminating short of the edges of the member. It is immaterial so far as the invention is concerned how the groove is formed therein. An angle piece 8' is inserted into the grooves 8 to join the edges together.

The edges 3' of the outer side members 9 likewise are beveled, with grooves 9' into which a channel shaped reinforcing strip 10 is inserted to line the groove, and this strip 10 has margins 11 extended to cover the exposed surfaces of the beveled edges 3'. This reinforcing strip may be of any suitable material, but is preferably asbestos paper felt, either preformed to the contour of the edges of the side members or else pressed into such form from a flat sheet at the time that same is applied as an edging strip. It is preferably adhesively secured to the members by an adhesive applied to the contacting surfaces. It will be understood that the inner sections 7 may have strips with margins protecting their edges, like strips 10.

The side members are assembled by inserting angle pieces 12 at the corners into the adjacent grooves of the reinforcing strips 10 of the abutting members. This angle piece 12, as well as the angle piece 8', may be of any suitable material, preferably a single laminated strip of reinforced asbestos fabric material. Adhesive or cement is preferably applied to the surfaces of the angle pieces in order that they will be securely bonded in place and an air tight seal be obtained between the abutting edges. The outer wall member of the section is of the same general construction as the inner wall member, the only difference being that the side members of the outer section are preferably composed of indented plies 13 alternately disposed with flat plies 14. The inner section is composed of flat or plain plies 14'. The sides of the inner section could, however, be of the same construction as the side of the outer section, and vice versa. Conduits of the above construction, whether having inner and outer walls or only a single wall, can be compactly packaged and bundled in a knock down condition for handling and shipment and be readily assembled on the job by fitting and adhering the parts together. No nails or screws are necessary, although, if desired, these could be projected from the outside to engage the sides of the angle pieces 12 and help in holding the parts in position until the adhesive has set.

I claim:

1. A conduit construction composed of a plurality of wall units adapted to be fitted together in close abutting relation and comprised of laminated fabricated fibrous sheets, an angle fitting embedded in each of the longitudinal mating edges of the wall units, and adhesive material applied to the angle fitting and the mating edges.

2. A conduit construction composed of a plurality of wall units adapted to be fitted together in close abutting relation and comprised of laminated fabricated fibrous sheets, a groove formed in the longitudinal edges of the units, a reenforcing strip applied to each of said longitudinal edges and lining the grooves, an angle seated within the grooves of abutting units, and an adhesive applied to the mating edges of the units.

3. A conduit construction composed of wall units adapted to be fitted together in close abutting relation, a groove formed in the longitudinal edges of the units, a reenforcing strip applied to each of said longitudinal edges and lining the grooves, an angle seated within each of the grooves of abutting units and an adhesive applied to the mating edges of the units.

4. A wall unit for constructing conduits comprised of laminated fabricated fibrous sheets, a groove formed in the longitudinal edges of the unit, and a reenforcing strip applied to each of the edges and lining the grooves.

5. A wall unit for constructing conduits comprised of laminated fabricated fibrous sheets and having beveled longitudinal edges, a groove formed in the longitudinal edges, and a reenforcing strip applied to each of the edges and lining the grooves.

6. A wall unit for constructing air conduits comprised of laminated fabricated fibrous sheets and having a groove formed in each of the longitudinal edges of the unit, and means for reenforcing the grooved edges.

7. An air conduit construction composed of a plurality of wall units adapted to be fitted together in close abutting relation and comprised of fabricated fibrous sheets, an angle fitting embedded in each of the longitudinal edges of the wall units, and adhesive material applied to the angle fitting and the mating edges.

8. An air conduit construction composed of a plurality of wall units adapted to be secured together in abutting relation and comprised of fabricated fiber containing sheets, a rigid corner piece having sides bridging the corner joint of abutting units, and adhesive material applied to bond the corner piece in place and seal the joint between the abutting edges of the wall units.

9. An air conduit construction composed of a plurality of wall units adapted to be secured together in abutting relation and comprised of fabricated fiber containing sheets, a rigid corner piece having sides bridging the corner joint of abutting units, adhesive material applied to bond the corner pieces to the wall units, and fastening means to secure the wall units and the corner pieces together preliminary to the hardening of the adhesive.

10. An air conduit construction composed of a plurality of wall units adapted to be fitted together in close abutting relation and comprised of fabricated fibrous sheets, an angle fitting embedded in each of the longitudinal edges of the wall units, and adhesive material applied to the angle fitting.

WILLIAM D. CALLAN.